(No Model.)
W. F. YOUNG.
LATHE.
No. 470,278. Patented Mar. 8, 1892.
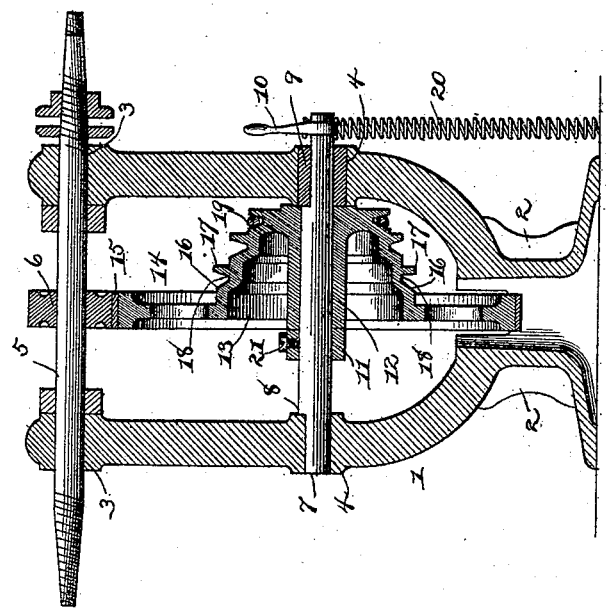
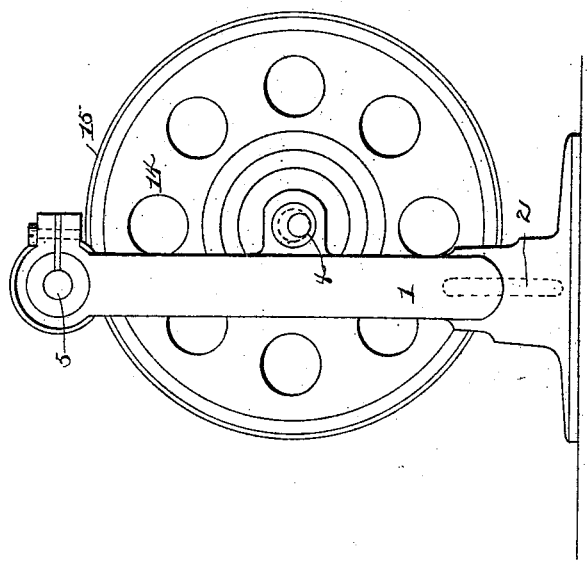
Witnesses:
B. S. Ober
W. S. Duvall
Inventor
William F. Young,
By his Attorneys,
C. A. Snow & Co.
THE NORRIS PETERS CO., PHOTO-LITHO., WASHINGTON, D. C.

UNITED STATES PATENT OFFICE.

WILLIAM F. YOUNG, OF TOLEDO, OHIO, ASSIGNOR OF ONE-HALF TO JOHN F. KOHNE, OF SAME PLACE.

LATHE.

SPECIFICATION forming part of Letters Patent No. 470,278, dated March 8, 1892.

Application filed June 6, 1891. Serial No. 395,369. (No model.)

*To all whom it may concern:*

Be it known that I, WILLIAM F. YOUNG, a citizen of the United States, residing at Toledo, in the county of Lucas and State of Ohio, have invented a new and useful Lathe, of which the following is a specification.

This invention relates to improvements in that class of lathes employed by dentists and jewelers for buffing, polishing, and grinding.

The objects in view are to provide a lathe of cheap and simple construction that will run with great lightness and rapidity, without lost motion, and with but little power.

Other objects and advantages of the invention will appear in the following description, and the novel features thereof will be particularly pointed out in the claims.

Referring to the drawings, Figure 1 is a side elevation of a lathe constructed in accordance with my invention. Fig. 2 is a vertical section of the same.

Like numerals of reference indicate like parts in all the figures of the drawings.

1 designates a U-shaped frame, which is mounted upon a suitable flared base 2, the frame having its terminals, which constitute standards, provided at their upper ends with bearings 3, and below the same near their middle with transverse bearing-openings 4.

In the upper bearings 3 there is mounted for rotation the usual shaft 5, threaded at its ends and provided with other adjuncts adapting it to receive the buffing, polishing, and other grinding devices ordinarily employed. Upon the shaft 5 there is rigidly mounted a small friction-pulley 6.

In the bearings 4 are mounted the reduced eccentric bearing ends 7 of a rotatable shaft 8, one end of the shaft being mounted in a suitable bushing 9, extended beyond the same and there provided with an arm 10, for a purpose hereinafter apparent. Upon the shaft 8 there is loosely mounted a cylindrical hub 12, at one end of which there is located a truncated cone-shaped shell 13, at the inner end of which or base there is located a large pulley 14, having a frictional tire 15, adapted to run in contact with the periphery of and rotate the small pulley 6. At intervals the truncated cone-shaped shell 13 is provided with annular grooves or steps 16, at the outer sides of which flanges 17 are formed, whereby the inner walls of the grooves and the flanges combine to form belt-receiving grooves or treads 18, designed to receive the usual belt 19, operated by the ordinary fly-wheel. (Not shown.) A collar 11 is adjustably secured by a set-screw 21 upon the shaft 8 and serves to maintain the hub 12 in position upon said shaft. A spring 20 (or it may be its equivalent, an ordinary weight) is attached to the free end of the arm 10, so that by reason of the fact that the arm extends laterally from the eccentric bearing at the same side of the shaft as the bearing is located it exerts a tendency to elevate and maintain the periphery of the large drive-pulley in yielding frictional contact with the periphery of the pulley 6.

It will be obvious that the belt 19 may be changed and placed in any of the grooves 18, so that the large pulley will be driven at increased or diminished speed, in accordance with the diameter of the groove in which it is located. The proportion between the large pulley 14 and small pulley 6 is such that slow rotations of the large pulley will cause exceedingly rapid rotations of the small pulley and shaft. If desired, the pulleys 14 and 6 need not run in actual contact, but may be connected by a belt; but I prefer the construction herein shown for the fact that no lost motion can occur. By disconnecting the spring or weight from the arm 10 the eccentricity of the shaft 8 will cause the shaft to partially rotate and thus lower the pulley 14 from contact with the pulley 6.

The hub 12 may be maintained in position by any suitable device, and in this instance I employ for this purpose the before-mentioned collar 11, through which I pass an ordinary set-screw 21, binding upon the shaft.

Having described my invention, what I claim is—

1. In a lathe of the class described, the combination, with opposite standards provided intermediate their ends and at their upper ends with bearings, a rotatable shaft mounted in the upper bearings and adapted to receive lathe-tools, and a small pulley mounted upon the shaft between its bearings, of a lower shaft mounted in the intermediate bearings, a hub mounted on the same and provided with a truncated cone-shaped shell terminating at its inner end or base in a large pulley having frictional contact with the small pulley before mentioned, said shell being provided at intervals with annular grooves, the outer walls of which are formed by annular flanges formed on the shell, and means for throwing the large pulley into and out of contact with the small pulley, substantially as specified.

2. The combination, with the U-shaped frame having the upper bearings 3 and lower bearings 4, of the shaft 5, mounted for rotation in the upper bearings, the small pulley 6, mounted fast upon the shaft, the lower shaft 8, having eccentric reduced ends 7, one of which extends beyond the bearing and is provided with a lateral arm 10, the collar 11, the set-screw 21 for securing the same upon the shaft 8, the cylindrical hub 12, having the integral shell 13, terminating at its base in the large pulley 14, having frictional contact with the pulley 6, said conical shell being provided at intervals with annular belt-receiving grooves, the outer walls of which are formed by annular flanges 17, and the spring connected to the outer end of the arm 10, substantially as specified.

In testimony that I claim the foregoing as my own I have hereto affixed my signature in presence of two witnesses.

WILLIAM F. YOUNG.

Witnesses:
SAMUEL KOHN,
GEO. T. LEE.